(12) United States Patent
Hashim et al.

(10) Patent No.: US 8,125,182 B2
(45) Date of Patent: Feb. 28, 2012

(54) AUTOMOTIVE VEHICLE AND METHOD FOR CHARGING/DISCHARGING A POWER STORAGE UNIT THEREIN

(75) Inventors: Hasdi R. Hashim, Ann Arbor, MI (US); Donald Charles Franks, Linden, MI (US); Bruce Carvell Blakemore, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 12/404,558

(22) Filed: Mar. 16, 2009

(65) Prior Publication Data
US 2010/0231169 A1 Sep. 16, 2010

(51) Int. Cl.
*H02J 7/14* (2006.01)
*H02J 7/00* (2006.01)
(52) U.S. Cl. ........................ 320/104; 320/134
(58) Field of Classification Search .................. 320/104, 320/134
See application file for complete search history.

(56) References Cited

U.S. PATENT DOCUMENTS

| | | | |
|---|---|---|---|
| 6,107,691 A | 8/2000 | Gore et al. | |
| 6,531,847 B1 * | 3/2003 | Tsukamoto et al. | 320/135 |
| 6,925,361 B1 | 8/2005 | Sinnock | |
| 7,265,455 B2 | 9/2007 | Oyobe et al. | |
| 7,309,966 B2 | 12/2007 | Wobben | |
| 7,772,829 B2 * | 8/2010 | Shuey | 324/142 |
| 7,889,524 B2 * | 2/2011 | Lee et al. | 363/65 |
| 2002/0153726 A1 | 10/2002 | Sumner | |
| 2004/0062059 A1 | 4/2004 | Cheng et al. | |
| 2006/0250902 A1 | 11/2006 | Bender et al. | |
| 2007/0282495 A1 | 12/2007 | Kempton et al. | |

OTHER PUBLICATIONS

Timothy C.Y. Wang, et al., Output Filter Design for a Grid-Interconnected Three-Phase Inverter, GE Global Research Center, One Research Circle Niskayuna, NY 12309, USA, 0-7803-7754-0/03/$17.00 Copyright 2003 IEEE, pp. 779-784.

* cited by examiner

*Primary Examiner* — M'Baye Diao
(74) *Attorney, Agent, or Firm* — David B. Kelley; Brooks Kushman P.C.

(57) ABSTRACT

An automotive vehicle includes an electrical circuit capable of being electrically connected with an electrical grid, a propulsion electrical bus electrically connected with the circuit, a power conversion module electrically connected with the propulsion electrical bus, and a power storage unit electrically connected with the power conversion module.

11 Claims, 3 Drawing Sheets

AUTOMOTIVE VEHICLE AND METHOD FOR CHARGING/DISCHARGING A POWER STORAGE UNIT THEREIN

BACKGROUND

Electrical power systems for automotive vehicles may be arranged in one of several known configurations. As an example, United States Publication Number 2006/0250902 to Bender et al. discloses a plug-in hybrid propulsion system where the energy storage element of the hybrid drivetrain may be charged with externally supplied electricity as well as energy from the engine or regenerative braking.

As another example, United States Publication Number 2004/0062059 to Cheng et al. discloses a power system comprising a bi-directional converter. The power system combines a power inverter and a charger for charging one or more electrical storage devices. A first switch selectively couples one or more AC devices to the bi-directional converter. A second switch selectively couples a boosting circuit to one or more DC devices and/or reverses polarity of the coupling.

As yet another example, U.S. Pat. No. 7,309,966 to Wobben discloses a motor vehicle comprising at least one electric motor, an energy storage device for providing drive energy for the electric motor, a plug connector connected to the energy storage device for connection to a current source, and a control means for controlling the flow of current from the current source to the energy storage device. The control means permits a flow of current from the energy storage device to the electric power network. An inverter is provided, in or outside the vehicle, by means of which the electrical power of the energy storage device can be fed in the form of alternating current into the electric power network.

SUMMARY

An automotive vehicle includes an electrical circuit capable of being electrically connected with an electrical grid, a propulsion electrical bus electrically connected with the circuit, a power conversion module electrically connected with the propulsion electrical bus, and a power storage unit electrically connected with the power conversion module. The circuit is configured to rectify current received from the electrical grid. The propulsion electrical bus is configured to pass the rectified current. The power conversion module is configured to buck or boost a voltage associated with the rectified current. The power storage unit is configured to receive at least a portion of the rectified current from the power conversion module.

A method for charging a power storage unit of an automotive vehicle includes rectifying current from an electrical grid via an on-board circuit, passing the rectified current to a propulsion electrical bus, and boosting a voltage associated with the rectified current via a power conversion module electrically connected with the propulsion electrical bus. The method also includes receiving the rectified current in the power storage unit.

A method for discharging energy from a power storage unit of an automotive vehicle includes passing energy from the power storage unit to a power conversion module, bucking a voltage of the energy via the power conversion module, and passing the energy at the bucked voltage from the power conversion module to an inverter circuit via a propulsion electrical bus. The method also includes inverting a current of the energy via the inverter circuit and passing the energy to an electrical grid.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
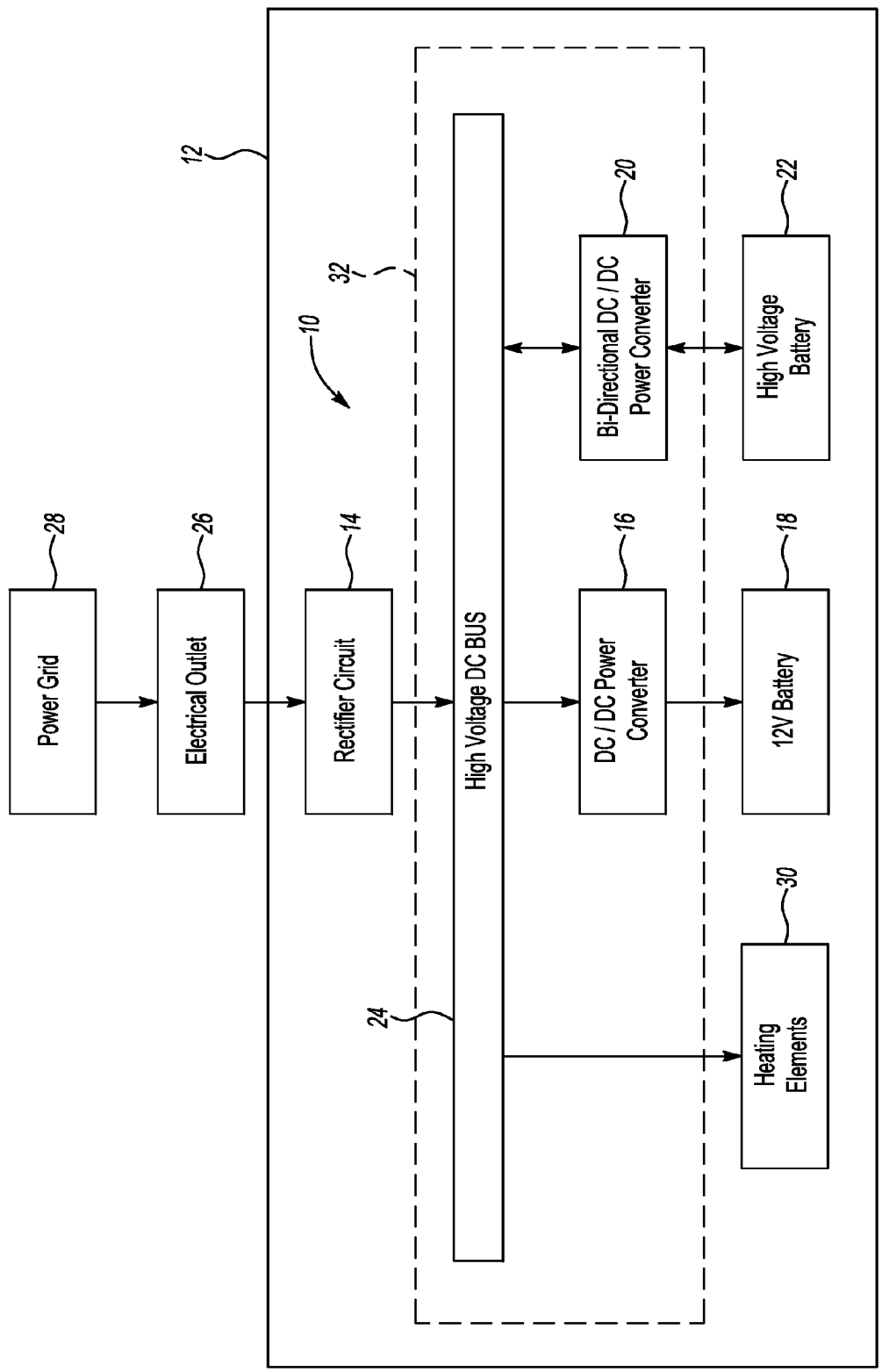
FIG. 1 is a block diagram of an embodiment of an automotive vehicle power system.

Referring now to FIG. 1, an embodiment of a power system 10 of an automotive vehicle 12 may include a rectifier circuit 14, a DC/DC power converter 16, a low voltage power storage unit 18, such as a 12V battery, a bi-directional DC/DC power converter 20, and a high voltage power storage unit 22, such as a traction battery, ultra capacitor, etc. The rectifier circuit 14, DC/DC power converter 16 and bi-directional DC/DC power converter 20 are electrically connected with a high voltage, e.g., 450 V, DC bus 24 (propulsion bus). The DC/DC power converter 16 is electrically connected with the storage unit 18. The bi-directional DC/DC power converter 20 is electrically connected with the power storage unit 22.

In the embodiment of FIG. 1, the rectifier circuit 14 includes four diodes arranged in a bridge configuration. In other embodiments, six diodes may be arranged in a known fashion to form a 3-phase uni-directional rectifier. In still other embodiments, a known H-bridge inverter may be used. Other configurations are also possible.

As known to those of ordinary skill, certain rectifier circuits (such as the rectifier circuit 14 illustrated in FIG. 1) may passively rectify AC current to DC current. That is, external electrical control is not needed for rectification to occur. Other rectifier circuits (examples of which are discussed below) may actively rectify AC current to DC current. That is, external electrical control is needed for rectification to occur. Passive or active circuits may be used depending upon, for example, design considerations and performance needs.

The rectifier circuit 14 may be electrically connected, e.g., plugged-in, with a 110 V electrical wall outlet 26. As known in the art, the electrical wall outlet 26 may supply power from an electrical power grid 28.

Electrical power from the rectifier circuit 14 may be passed to the high voltage bus 24 as indicated by arrow. In the example of FIG. 1, this electrical power has a voltage of 110 V. While this voltage may be lower than a normal operating voltage for the high voltage bus 24, it may be used to charge the storage units 18, 22 and/or provided to other loads electrically connected with the high voltage bus 24, such as heating elements 30. For example, the DC/DC power converter 16 may buck the 110 V to 12 V, in a known fashion, to charge the storage unit 18. The bi-directional DC/DC power converter 20 may boost the 110 V to 300 V, in a known fashion, to charge the storage unit 22.

As apparent to those of ordinary skill, the high voltage bus 24 has an additional operating voltage mode compared to conventional high voltages busses. That is, the high voltage bus 24 may be at 0 V (power-off mode), 450 V (propulsion mode), or 110 V (plug-in mode). In certain embodiments, electrical devices connected to the propulsion bus 24 may need to function differently in plug-in mode compared to propulsion mode. Due to the reduced availability of electrical power in the plug-in mode, such electrical devices may be, for example, turned off or operated with de-rated performance.

Figure 2:
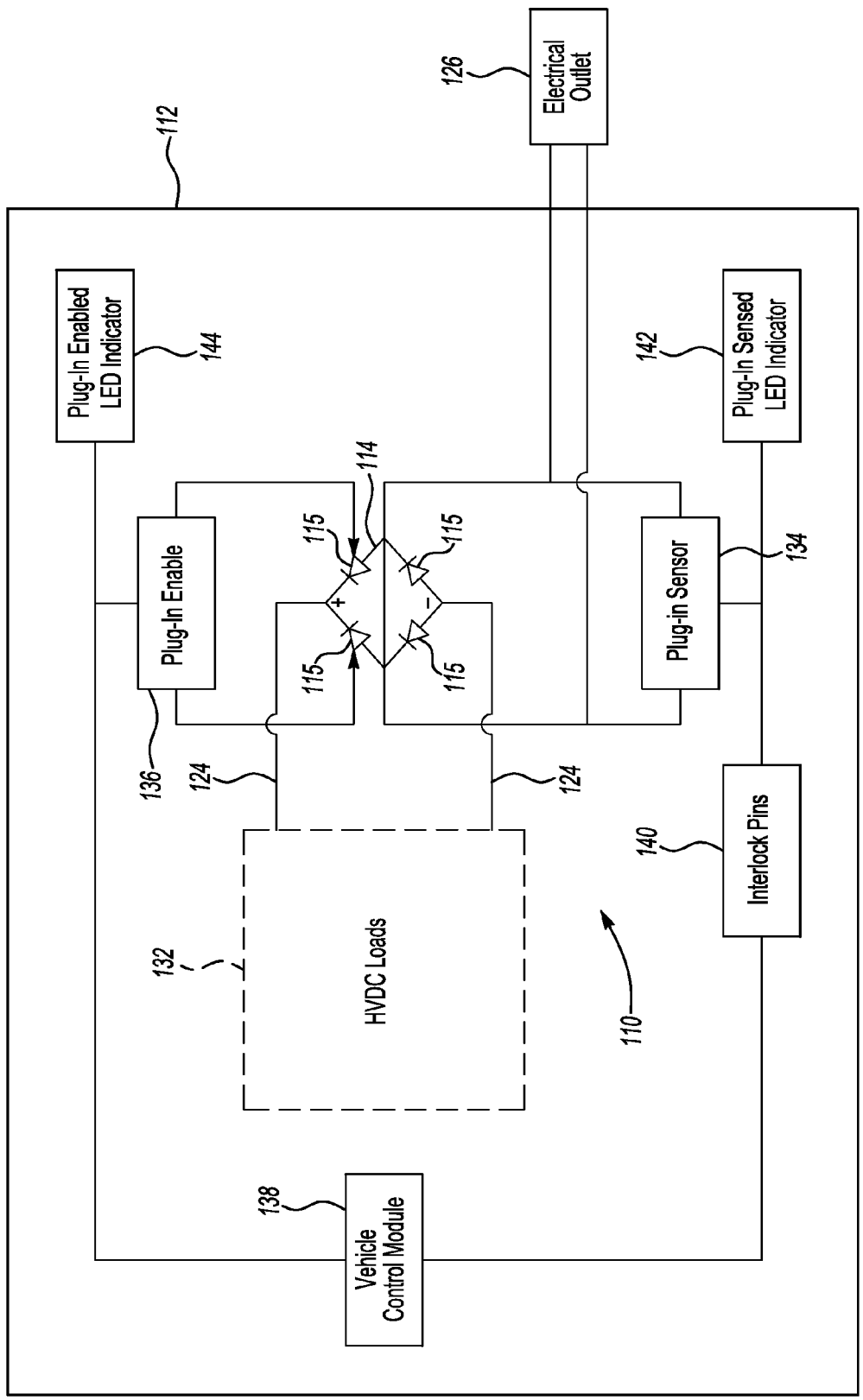
FIG. 2 is a block diagram of another embodiment of an automotive vehicle power system.

Referring now to FIG. 2, numbered elements that differ by 100 relative to the numbered elements of FIG. 1 have descriptions similar to the numbered elements of FIG. 1. An embodiment of a power system 110 for a vehicle 112 may include a bridge rectifier 114 (having four diodes 115), high voltage DC loads 132, e.g., power converters, heating elements, etc., plug-in sensor circuit 134, and plug-in enable circuit 136. The plug-in sensor circuit 134 may have any suitable configuration and detect whether the bridge rectifier 114 has been electrically connected with a power source, such as an electrical wall outlet 126. The plug-in enable circuit 136 may also have any suitable configuration and, when activated, enable the operation of the gate-controlled bridge rectifier 114.

In other embodiments, gate-controlled diodes, e.g. thyristors or SCRs, may be substituted for the diodes 115 in the bridge rectifier 114 and a relay placed between the bridge rectifier 114 and the electrical wall outlet 126. In such embodiments, the plug-enable circuit 136 may activate the relay to switch AC power from the electrical wall outlet 126 to the bridge rectifier 114.

In the embodiment of FIG. 2, the circuits 134, 136 are electrically connected with a vehicle control module 138. In some embodiments, interlock pins 140 for breakaway/plug-in interlock may be included in the electrical connection between the plug-in sensor circuit 134 and the vehicle control module 138. Other configurations and arrangements, however, are also possible.

If the plug-in sensor circuit 134 detects that the vehicle 112 has been "plugged-in," it sends a signal to the vehicle control module 138 informing it of such. In response, the vehicle control module 138 activates, in any suitable fashion, the plug-in enable circuit 136.

Indicators 142, 144, e.g., LEDs, electrically connected with the plug-in sensor circuit 134 and plug-in enable circuit 136 respectively may be used to provide visual feedback regarding the operation of the plug-in sensor circuit 134 and plug-in enable circuit 136. That is, if the vehicle 112 is "plugged-in," the indicator 142 will activate. If the bridge rectifier 114 is operational, the indicator 144 will activate.

Figure 3:
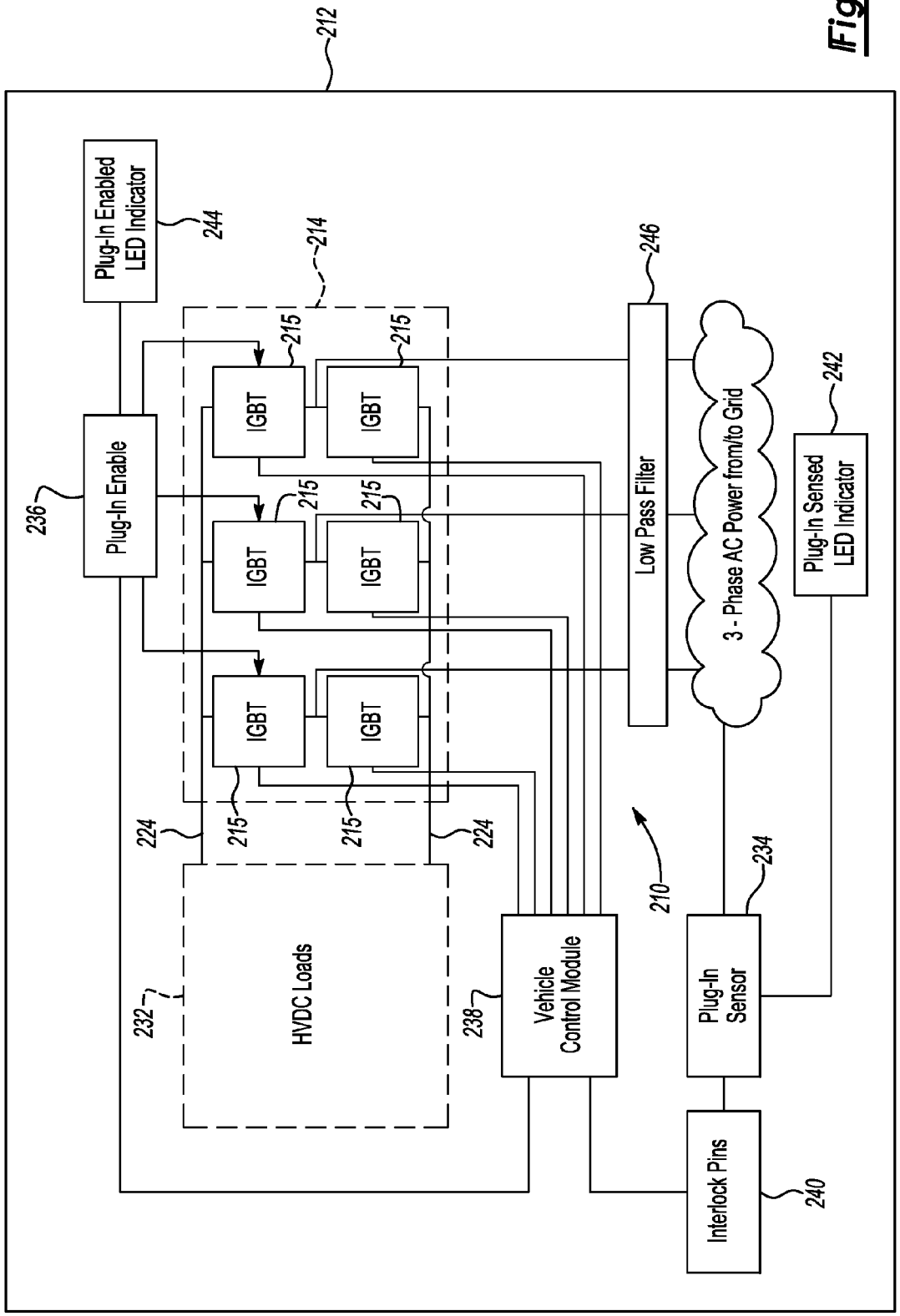
FIG. 3 is a block diagram of yet another embodiment of an automotive vehicle power system.

Referring now to FIG. 3, numbered elements that differ by 100 relative to the numbered elements of FIG. 2 or 200 relative to the numbered elements of FIG. 1 have descriptions similar to the numbered elements of FIGS. 2 and 1 respectively. An embodiment of a power system 210 for a vehicle 212 may include an inverter circuit 214, high voltage DC loads 232, e.g., bi-directional DC/DC power converter, etc., plug-in sensor circuit 234, plug-in enable circuit 236 and low pass filter 246. As explained in detail below, the power system 210 may receive power from an electrical grid or provide power to the electrical grid.

The inverter circuit 214 of FIG. 3 includes a plurality of IGBTs 215 arranged in a known fashion. Any suitable inverter arrangement, however, may be used. As an example, MOSFETs may be used instead of the IGBTs 215. As another example, two pairs of IGBTs 215 may be arranged in a known fashion to form a single-phase bi-directional circuit.

As apparent to those of ordinary skill, some of the IGBTs 215 are electrically connected with the plug-in enable circuit 236 and each of the IGBTs 215 are electrically connected with the vehicle control module 238, i.e., the 3-phase inverter circuit 214 is actively driven. The inverter circuit 214 of FIG. 3 also includes a diode built into each IGBT 215. As such, passive rectification may occur when the inverter circuit 214 is plugged-in to the electrical grid.

In other embodiments, some of the diodes may be gate-controlled (thyristors or SCRs may be substituted for the diodes) such that they must be activated for 3-phase rectification to occur. In embodiments without gate-controlled diodes, a relay may be used to switch AC power from the electrical grid to the circuit 214. Any suitable arrangement, however, may be used.

If the plug-in sensor circuit 234 detects that the vehicle 212 has been plugged-in, it sends a signal to the vehicle control module 238 informing it of such. In response, the vehicle control module 238 controls the IGBTs 215, in a known fashion, and activates the plug-in enable circuit 236 such that the inverter circuit 214 may provide 3-phase power (by active inversion) into the electrical grid or receive 3-phase power (by passive or active rectification) from the electrical grid.

IGBT operation may be coordinated, for 3-phase active inversion, such that the three AC lines are powered in the following repeating sequence: Low-High-Low, High-High-Low, High-Low-Low, High-Low-High, Low-Low-High, and Low-High-High. IGBT operation may be coordinated, for 3-phase active rectification, such that the AC current applied by the inverter circuit 214 is in phase with the AC current applied by the electrical grid.

If power from, for example, a high voltage battery (not shown) electrically connected with the bi-directional DC/DC power converter 232 is to be supplied to the electrical grid, the vehicle control module 238 may control the switching of the IGBTs 215, in a known fashion, and activate the plug-in enable circuit 236 such that the inverter circuit 214 may receive (and actively invert) DC current from the high voltage battery. This inverted power may then pass through the low pass filter 246 to filter or smooth out the generated AC current before entering the electrical grid as 3-phase power.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:
1. An automotive vehicle comprising:
   a controller;
   electrical circuitry including (i) a detection circuit configured to notify the controller when an electrical grid is electrically connected with the circuitry and (ii) a rectifier circuit, wherein the controller is configured to enable the rectifier circuit to rectify current received from the electrical grid in response to receiving the notification;
   a propulsion electrical bus electrically connected with the circuitry and configured to pass the rectified current;
   a power conversion module electrically connected with the propulsion electrical bus and configured to buck or boost a voltage associated with the rectified current; and
   a power storage unit electrically connected with the power conversion module and configured to receive at least a portion of the rectified current from the power conversion module.

2. The vehicle of claim 1 wherein the current comprises alternating current.

3. The vehicle of claim 1 wherein the rectifier circuit comprises a bridge rectifier circuit.

4. The vehicle of claim 1 wherein the circuitry further includes an inverter circuit.

5. The vehicle of claim 1 further comprising an electrical load electrically connected with the propulsion electrical bus.

6. The vehicle of claim 5 wherein the electrical load is configured to receive at least a portion of the rectified current from the propulsion electrical bus.

7. The vehicle of claim 5 wherein the electrical load comprises a heating element.

8. The vehicle of claim 1 wherein the power conversion module comprises a bi-directional DC/DC power converter.

9. The vehicle of claim 1 wherein the power storage unit comprises a traction battery.

10. A method for charging a power storage unit of an automotive vehicle comprising:
    generating a notification when an electrical grid is electrically connected with the vehicle;
    in response to the notification, enabling a rectifier circuit to rectify current from the electrical grid;
    passing the rectified current to a propulsion electrical bus;
    boosting a voltage associated with the rectified current via a power conversion module electrically connected with the propulsion electrical bus; and
    receiving, from the power conversion module, the rectified current in the power storage unit thereby charging the power storage unit.

11. The method of claim 10 wherein the current comprises alternating current.

* * * * *